United States Patent
Liu et al.

(10) Patent No.: US 10,091,784 B1
(45) Date of Patent: Oct. 2, 2018

(54) DEVICE-TO-DEVICE (D2D) SCHEDULING CONTROL IN ORTHOGONAL FREQUENCY DIVISION MULTIPLEXING (OFDM) WIRELESS SYSTEM

(71) Applicant: Sprint Communications Company L.P., Overland Park, KS (US)

(72) Inventors: Chunmei Liu, Great Falls, VA (US); Krishna D. Sitaram, Chantilly, VA (US); Hemanth Balaji Pawar, Brambleton, VA (US); Pratik Kothari, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 55 days.

(21) Appl. No.: 15/396,456

(22) Filed: Dec. 31, 2016

(51) Int. Cl.
| | |
|---|---|
| *H04W 72/04* | (2009.01) |
| *H04W 72/12* | (2009.01) |
| *H04W 24/08* | (2009.01) |
| *H04W 28/02* | (2009.01) |
| *H04W 76/14* | (2018.01) |
| *H04W 88/08* | (2009.01) |
| *H04B 17/336* | (2015.01) |
| *H04L 1/18* | (2006.01) |
| *H04J 11/00* | (2006.01) |
| *H04W 76/02* | (2009.01) |

(52) U.S. Cl.
CPC ...... *H04W 72/0446* (2013.01); *H04B 17/336* (2015.01); *H04J 11/00* (2013.01); *H04L 1/1861* (2013.01); *H04W 24/08* (2013.01); *H04W 28/0268* (2013.01); *H04W 72/0453* (2013.01); *H04W 72/1231* (2013.01); *H04W 76/023* (2013.01); *H04W 76/14* (2018.02); *H04J 2011/0009* (2013.01); *H04W 88/08* (2013.01)

(58) Field of Classification Search
CPC combination set(s) only.
See application file for complete search history.

(56) References Cited

U.S. PATENT DOCUMENTS

| | | |
|---|---|---|
| 5,491,694 A | 2/1996 | Oliver et al. |
| 5,680,303 A | 10/1997 | Libucha et al. |

(Continued)

FOREIGN PATENT DOCUMENTS

| | | | |
|---|---|---|---|
| CN | 104105217 | 10/2014 | |
| JP | WO 2016076378 A1 * | 5/2016 | ............ H04W 16/14 |
| WO | 1997004564 | 2/1997 | |

*Primary Examiner* — Yee Lam

(57) ABSTRACT

An Orthogonal Frequency Division Multiplexing (OFDM) communication network controls Device-to-Device (D2D) scheduling. The OFDM access point wirelessly exchanges wireless communications with a plurality of individual User Equipment (UEs) using scheduled UE resources in a shared resource range. The OFDM access point wirelessly receives a first D2D communication request for a first D2D UE and responsively schedules D2D resources for the first D2D communication request in the shared resource range. The OFDM access point detects D2D interference for one of the plurality of individual UEs and determines that the D2D interference exceeds a D2D interference threshold. The OFDM access point wirelessly receives a second D2D communication request for a second D2D UE and responsively schedules D2D resources for the second D2D communication request in a D2D dedicated resource sub-range.

14 Claims, 7 Drawing Sheets

(56) References Cited

U.S. PATENT DOCUMENTS

| | | | |
|---|---|---|---|
| 8,554,200 B2 | 10/2013 | Ribeiro et al. | |
| 8,897,148 B2 | 11/2014 | Patil et al. | |
| 8,982,846 B2 | 3/2015 | Baker et al. | |
| 9,002,281 B2 | 4/2015 | Fwu et al. | |
| 2010/0151837 A1* | 6/2010 | Mang | H04L 47/245 |
| | | | 455/414.1 |
| 2012/0093098 A1 | 4/2012 | Charbit et al. | |
| 2012/0300662 A1 | 11/2012 | Wang et al. | |
| 2013/0322277 A1 | 12/2013 | Vanganuru et al. | |
| 2014/0094183 A1 | 4/2014 | Gao et al. | |
| 2015/0139087 A1* | 5/2015 | Luft | H04W 52/0251 |
| | | | 370/329 |
| 2015/0373730 A1* | 12/2015 | Fujishiro | H04L 1/0003 |
| | | | 455/450 |
| 2016/0088617 A1* | 3/2016 | Goldhamer | H04L 1/18 |
| | | | 370/330 |
| 2017/0251510 A1* | 8/2017 | Kitagawa | H04W 76/023 |

\* cited by examiner

DEVICE-TO-DEVICE (D2D) SCHEDULING CONTROL IN ORTHOGONAL FREQUENCY DIVISION MULTIPLEXING (OFDM) WIRELESS SYSTEM

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

Some wireless communication systems use Orthogonal Frequency Division Multiplexing (OFDM) to exchange wireless data. OFDM communication systems may be used to provide wireless signaling to the various wireless communication devices. The wireless access points, such as OFDM access points, perform wireless networking tasks like device handovers, radio interference, management, and multipoint coordination. To facilitate these wireless networking tasks, the wireless access points communicate over signaling links.

OFDM communication systems also offer a Device-to-Device communication service. The D2D communication service enables User Equipment to perform direct wireless transmission/reception without user data traversal through an OFDM access point. For the D2D service, the OFDM wireless access point allocates resources for one UE and schedules the other UEs to transmit over the same allocated resources. Therefore, the UE transmits directly to other UEs over the same resource blocks. The OFDM access point controls and schedules D2D communications between the UEs, but the OFDM access point does not relay user data between the UEs for the D2D communication service.

Although, D2D services allow UEs to access OFDM communication systems without relaying user data between the OFDM access point and the other UEs, D2D services may also result in interference issues when resources are not allocated efficiently. Unfortunately, OFDM access points are unable to efficiently schedule resources for UEs and D2D UEs without preventing a degradation of communication quality and interference.

TECHNICAL OVERVIEW

An Orthogonal Frequency Division Multiplexing (OFDM) communication network controls Device-to-Device (D2D) scheduling. The OFDM access point wirelessly exchanges wireless communications with a plurality of individual User Equipment (UEs) using scheduled UE resources in a shared resource range. The OFDM access point wirelessly receives a first D2D communication request for a first D2D UE and responsively schedules D2D resources for the first D2D communication request in the shared resource range. The OFDM access point detects D2D interference for one of the plurality of individual UEs and determines that the D2D interference exceeds a D2D interference threshold. The OFDM access point wirelessly receives a second D2D communication request for a second D2D UE and responsively schedules D2D resources for the second D2D communication request in a D2D dedicated resource sub-range.

DETAILED DESCRIPTION

Figure 1:
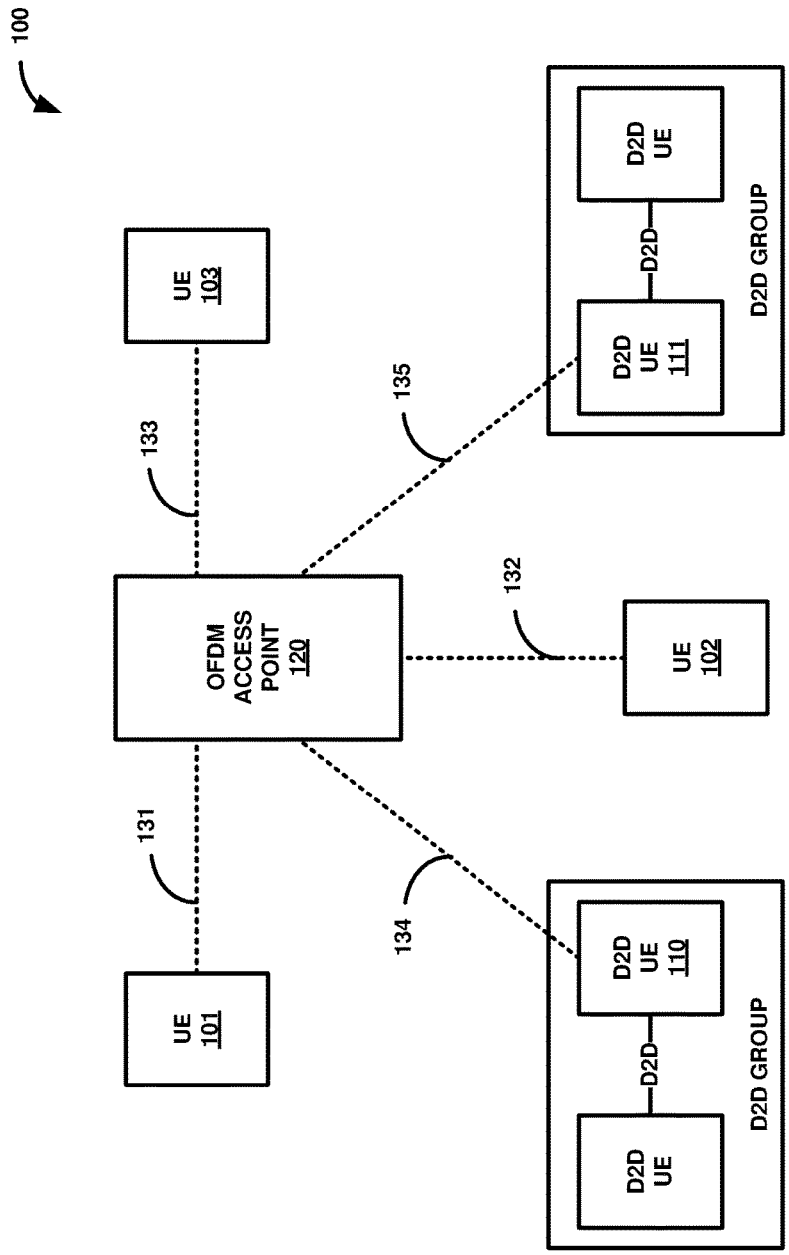
FIGS. 1-3 illustrates an Orthogonal Frequency Division Multiplexing (OFDM) communication network to control Device-to-Device (D2D) scheduling.
Figure 2:
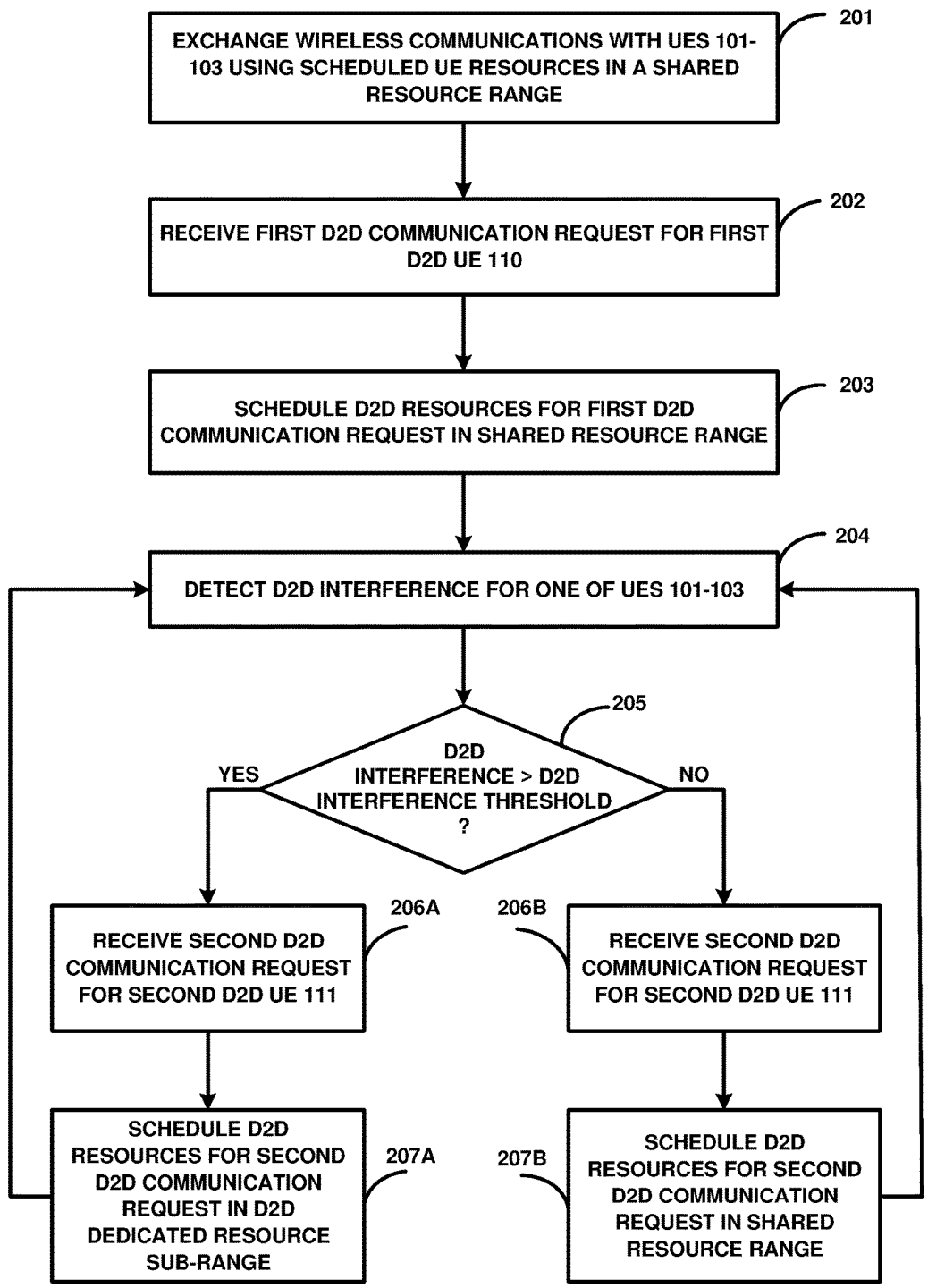
Figure 3:
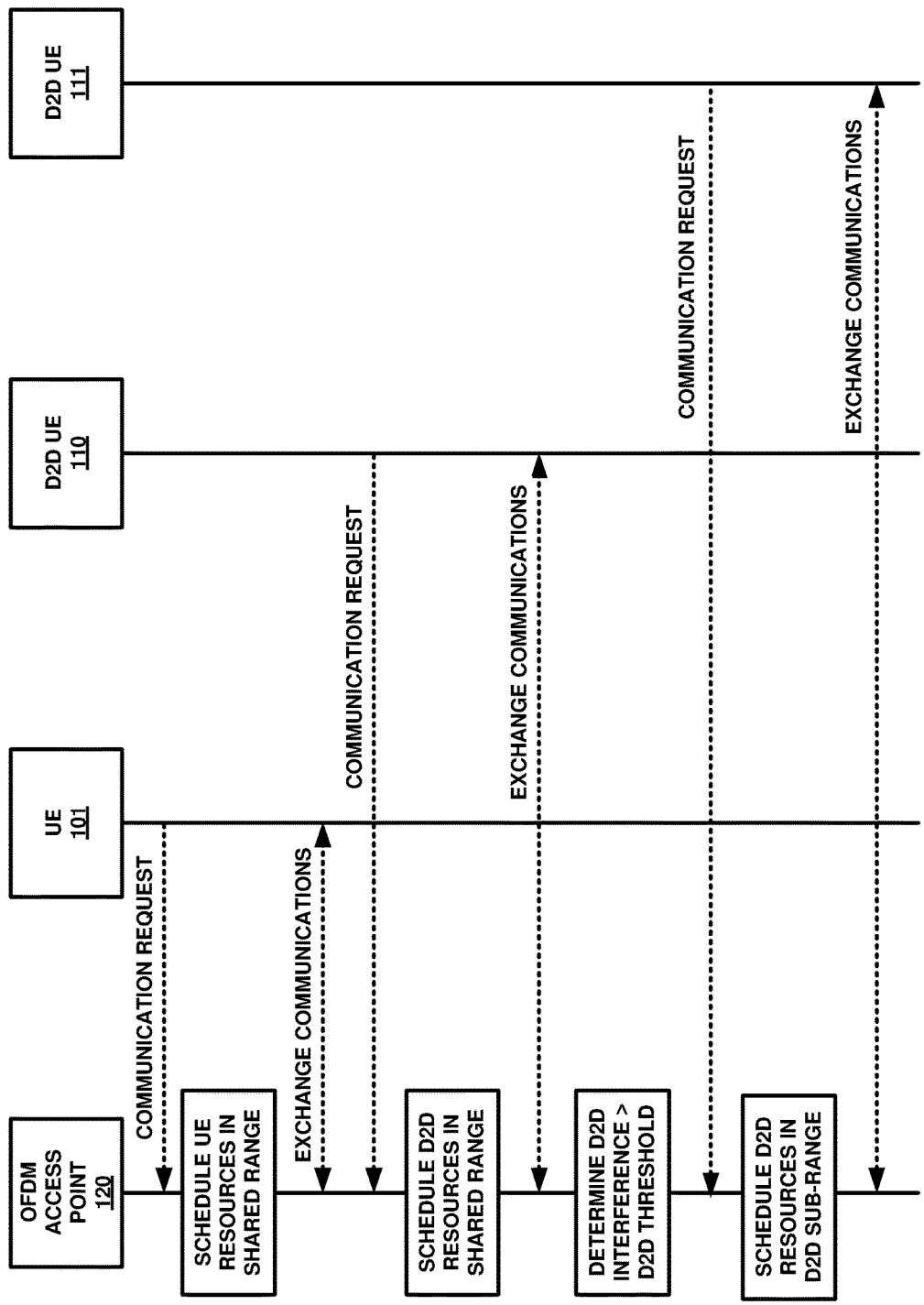

FIGS. 1-3 illustrate Orthogonal Frequency Division Multiplexing (OFDM) communication system 100 to control Device-to-Device (D2D) scheduling. Referring to FIG. 1, OFDM communication system 100 comprises User Equipment (UEs) 101-103, D2D UEs 110-111, and OFDM access point 120. UEs 101-103 communicate with OFDM access point 120 over wireless links 131-133. D2D UEs 110-111 communicate with OFDM access point 120 over wireless links 134-135. D2D UEs 110-111 are each included in a D2D group and communicate with additional UEs over D2D links.

UEs 101-103 and D2D UEs 110-111 could each be a phone, tablet computer, media device, an intelligent machine, or some other apparatus having a wireless transceiver. UEs 101-103 include processing circuitry and memory that store and execute various software modules. UEs 101-103 may wirelessly receive and transmit Radio Resource Control (RRC) signaling to attach, request services, and exchange data with OFDM access point 120 using scheduled UE resources in a shared resource range. D2D UEs 110-111 may be configured to provide wireless coverage to one or more UEs for voice calls, media streaming, internet access, text messages, and the like.

OFDM access point 120 may comprise a macro base station, picocell base station, femtocell base station, a wireless hotspot, an evolved NodeB (eNodeB), or some other OFDM access point that may provide wireless communication services to UEs 101-103 and D2D UEs 110-111. OFDM access point 120 includes communication transceivers comprising antennas, amplifiers, modulators, filers, and digital signal processors. OFDM access point 120 also includes data processing circuitry, memory, and operating software to control the transceivers and server network applications. OFDM access point 120 uses RRC signaling to perform UE attachment, schedule services, and exchange data with UEs 101-103 and D2D UEs 110-111. OFDM access point 120 is also configured to implement D2D communications by scheduling direct wireless transfers between UEs in the same D2D group.

Wireless communication links 130-135 use air or space as the transport media. Wireless communication links 130-135 may use various protocols, such as Long Term Evolution (LTE), Code Division Multiple Access (CDMA), Orthogonal Frequency Division Multiplexing Access (OFDMA), LTE Wireless Aggregation (LWA), Internet Protocol (IP), Evolution Data Only (EVDO), Worldwide Interoperability for Microwave Access (WIMAX), Global System for Mobile Communication (GSM), High Speed Packet Access (HSPA), or some other wireless communication format—including combinations thereof.

In operation, OFDM access point 120 wirelessly exchanges wireless communications with a plurality of individual UEs 101-103 using scheduled UE resources in a shared resource range. OFDM access point 120 may schedule resources by allocating each of UEs 101-103 resource blocks upon attachment to OFDM access point 120 or upon initiation of media services, such as a voice call, media streaming, internet access, and the like. Resource blocks may be allocated based on a timeslot, a frequency carrier, or both. The shared resource range may include any frequency channel or time interval that is open to be allocated for any UEs attached to OFDM access point 120, such as UEs 101-103.

OFDM access point 120 wirelessly receives a first D2D communication request for first D2D UE 110. OFDM access point 120 may receive the communication request for D2D UE 110 on behalf of itself or for one or more additional UEs. D2D UE 110 exchanges signaling and data directly with an additional UE without routing signaling and data through OFDM access point 120. It should be noted that D2D UE 110 and the additional UE in the D2D group share resources allocated by OFDM access point 120 for communications. Advantageously, this enables OFDM access point 120 to more efficiently serve more UEs using the shared resources for D2D links in D2D UE groups.

In response to receiving the first D2D communication request, OFDM access point 120 schedules D2D resources for the first D2D communication request in the shared resource range. OFDM access point 120 schedules the D2D resources for the first D2D communication request in the shared resource range where UEs 101-103 have also been scheduled resource blocks. It should be noted that inference may be caused for UEs in close proximity to D2D UE 110 when OFDM access point 120 schedules the D2D resources for the first D2D communication request in the shared resource range along with UE resources for UEs 101-103.

In a next operation, OFDM access point 120 detects D2D interference. D2D inference may be determined based on measurement reports received from the D2D UE, such as D2D UE 110, or from one of UEs 101-103 exchanging communications with OFDM access point 120. OFDM access point 120 receives measurement reports from UEs 101-103 and D2D UE 110 indicating channel conditions using the scheduled resources in the shared resource range.

In some examples, OFDM access point 120 detects the D2D interference based on a Signal-to-Noise Ratio (SNR) for one of UEs 101-103. In other examples, OFDM access point 120 detects the D2D interference based on a Hybrid Automatic Repeat Request (HARM) rate for one of UEs 101-103. In other examples, the D2D interference may also be determined based on a packet loss rate, Bit Error Rate (BER), Signal-to-Interference-Plus-Noise Ratio (SINR), Reference Signal Received Power (RSRP), Reference Signal Received Quality (RSRQ), or some other measurement indicating channel conditions.

OFDM access point 120 then determines that the D2D interference exceeds a D2D interference threshold. The D2D interference threshold may be statically set for OFDM access point 120 or dynamically determined by OFDM access point 120 or an OFDM network element, such as a Mobility Management Entity (MME), Policy and Changing Rule Function (PCRF), Home Subscriber Subsystem (HSS), or some other control element in the OFDM network capable of determining the D2D interference threshold.

In a next operation, OFDM access point 120 wirelessly receives a second D2D communication request for second D2D UE 111 and responsively schedules D2D resources for the second D2D communication request in a D2D dedicated resource sub-range. OFDM access point 120 may already have created a D2D dedicated resource sub-range or created the D2D dedicated resource sub-range in response to determining that the D2D interference exceeds the D2D interference threshold. In some examples, the D2D dedicated resource sub-range may comprise a D2D dedicated resource sub-range of a shared transmission timeslot interval. In other examples, the D2D dedicated resource sub-range may comprise a D2D dedicated sub-carrier within a shared frequency channel.

The D2D dedicated resource sub-range may be created statically where the resource sub-range consists of a predetermined sub-range of timeslots and frequency sub-carriers. However, the D2D dedicated resource sub-range may be set to dynamically expand as the number of D2D UEs scheduled in the D2D dedicated resource sub-range increases. In some examples, the D2D dedicated resource sub-range may include a maximum D2D dedicated resource sub-range threshold. In this examples, OFDM access point 120 may disable D2D resource allocation for additional D2D UEs when the number of scheduled resources exceeds the maximum D2D dedicated resource sub-range threshold.

FIG. 2 is a flow diagram illustrating an operation of OFDM communication system 100 to control D2D scheduling. OFDM access point 120 wirelessly exchanges (201) wireless communications with individual UEs 101-103 using scheduled UE resources in a shared resource range. OFDM access point 120 wirelessly receives (202) a first D2D communication request for first D2D UE 110 and responsively schedules (203) D2D resources for the first D2D communication request in the shared resource range. OFDM access point 120 detects (204) D2D interference for individual UE 101 and determines (205) that the D2D interference exceeds a D2D interference threshold.

If the D2D interference exceeds a D2D interference threshold, OFDM access point 120 wirelessly receives (206A) a second D2D communication request for second D2D UE 111 and responsively schedules (207A) D2D resources for the second D2D communication request in a D2D dedicated resource sub-range. If the D2D interference does not exceeds a D2D interference threshold, OFDM access point 120 wirelessly receives (206B) a second D2D communication request for second D2D UE 111 and responsively schedules (207B) D2D resources for the second D2D communication request in the shared resource range.

FIG. 3 illustrates a sequence diagram of OFDM communication system 100 to control D2D scheduling. In operation, OFDM access point 120 wirelessly exchanges wireless communications with individual UEs 101-103 using scheduled UE resources in a shared resource range. For example, OFDM access point 120 may schedule shared resources for each of UEs 101-103 attaching to OFDM access point 120 in response to a communication request. In this example, the shared resource range comprises a frequency channel range or a time slot range that is used for all attaching UEs, including UEs 101-103.

OFDM access point 120 wirelessly receives a first D2D communication request for first D2D UE 110. For example, D2D UE 110 may wirelessly transfer a voice call request on behalf of the UE included in the D2D UE group for D2D UE 110. OFDM access point 120 then responsively schedules D2D resources for the first D2D communication request in the shared resource range. For example, OFDM access point 120 may schedule D2D resources for the initiated voice call received from D2D UE 110 using resource blocks in a timeslot and frequency sub-carrier near to resource blocks in the timeslots and frequency sub-carriers used by UE 101-103. It should also be noted that in this example, UEs 101-102 are both in close proximity to D2D UE 110 and therefore, are experiencing increased signal interference.

OFDM access point 120 detects D2D interference for one individual UE 101. For example, OFDM access point 120 may detect D2D interference for UE 101 by UE 101 transferring an RF measurement report to OFDM access point 120 indicating high SNR while using the allocated resources in the shared resource range. OFDM access point 120 then compares the received D2D interference to a D2D interference threshold to determine that the D2D interference exceeds a D2D interference threshold.

OFDM access point 120 wirelessly receives a second D2D communication request for second D2D UE 111. For example, OFDM access point 120 wirelessly receives a media streaming request from D2D UE 111. In response to determining that the D2D interference exceeds the D2D interference threshold, OFDM access point 120 would then schedule the D2D resources for the media streaming request from D2D UE 111 in a D2D dedicated resource sub-range. In this example, OFDM access point 120 may schedule the D2D resources for the media streaming request from D2D UE 111 in the center frequency sub-carrier of the D2D dedicated resource sub-range.

In some examples, in response to scheduling D2D resources for the media streaming request from D2D UE 111 in the D2D dedicated resource sub-range, OFDM access point 120 may determine that the amount of D2D resources scheduled in the D2D dedicated resource sub-range exceeds a maximum D2D dedicated resource sub-range threshold. In this example, OFDM access point 120 may receive another D2D communication request for a third D2D UE and disable the D2D for the third D2D UE.

In some examples, in response to scheduling D2D resources for the media streaming request from D2D UE 111 in the D2D dedicated resource sub-range, OFDM access point 120 may receive additional D2D interference data and determine that the D2D interference does not exceed the D2D interference threshold. In this example, OFDM access point 120 may receive a third D2D communication request for a third D2D UE and responsively schedule D2D resources for the third D2D communication request in the shared resource range.

In some examples, OFDM access point 120 may receive a third D2D communication request indicating a Guaranteed Bit Rate (GBR) session bearer and responsively schedule D2D resources for the third D2D communication request in a priority resource range. In other examples, OFDM access point 120 may receive a third D2D communication request indicating a Wireless Priority Service (WPS) media session and responsively schedule D2D resources for the third D2D communication request in a priority resource range. The priority resource range may be included in a section of the D2D dedicated resource sub-range, in the shared resource range, or in some other priority designated resource allocation time interval or frequency.

Figure 4:
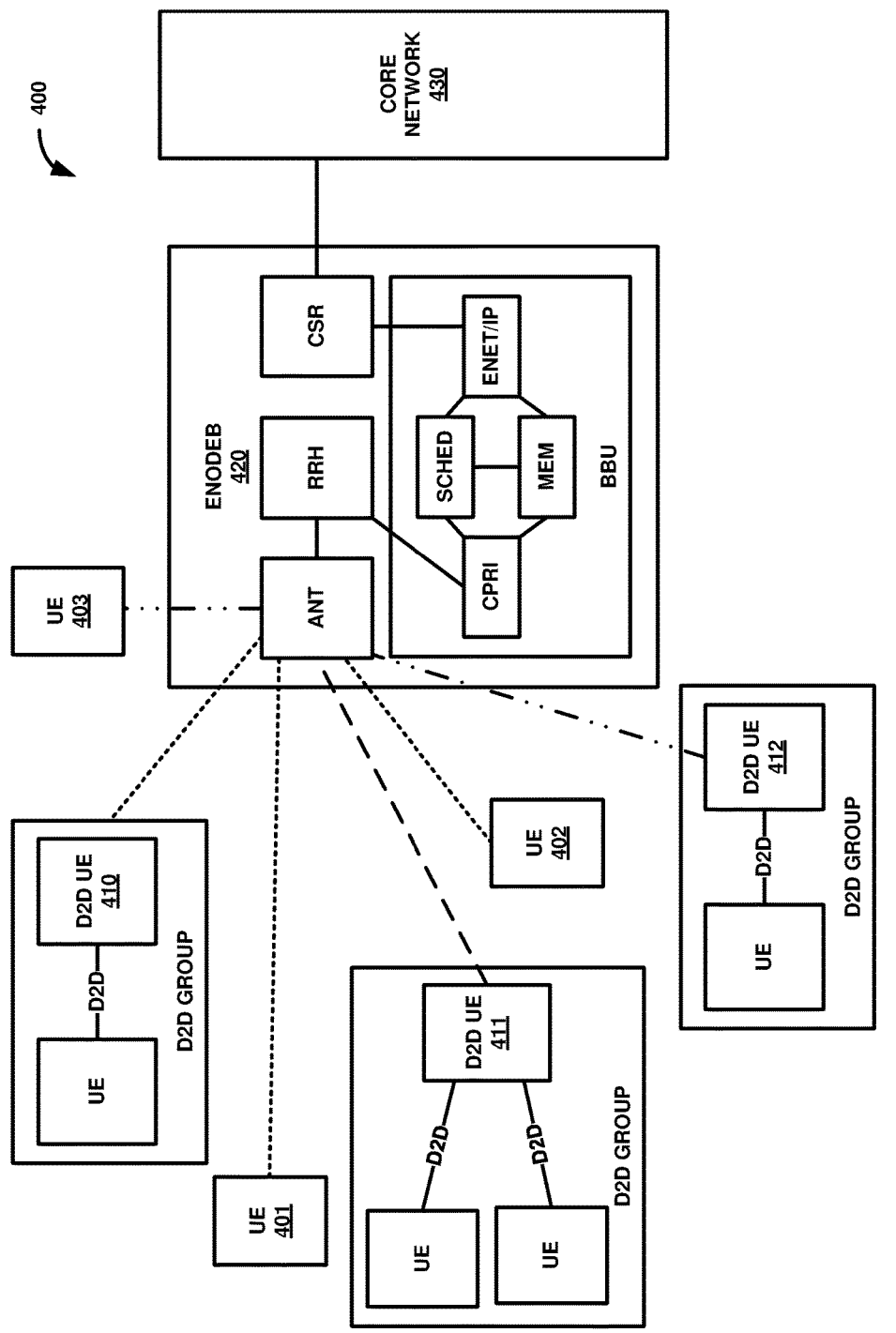
FIGS. 4-5 illustrate a Long Term Evolution (LTE) communication system to control D2D scheduling.

FIG. 4 illustrates LTE communication system 400 to control D2D scheduling. LTE communication system 400 is an example of OFDM communication system 100, although OFDM communication system 100 may use alternative configurations and operations. LTE communication system 400 comprises UEs 401-403, D2D UEs 410-412, LTE eNodeB 420, and LTE core network 430. LTE eNodeB 420 contains an antenna system, a Remote Radio Head (RRH), a Baseband Unit (BBU), and a Cell Switch Router (CSR). The BBU contains a Common Public Radio Interface (CPRI), memory, a resource block scheduler, and an Ethernet interface.

As indicated by the dotted lines, individual UEs 401-402 and D2D UE 410 exchange data and signaling with LTE eNodeB 420 using resources scheduled in a shared resource range. As indicated by the dashed lines, D2D UE 411 exchanges data and signaling with LTE eNodeB 420 using resources scheduled in a D2D dedicated resource sub-range.

As indicated by the dashed and dotted lines, UE 403 and D2D UE 412 exchange data and signaling with LTE eNodeB 420 using resources scheduled in a priority resource range.

Figure 5:
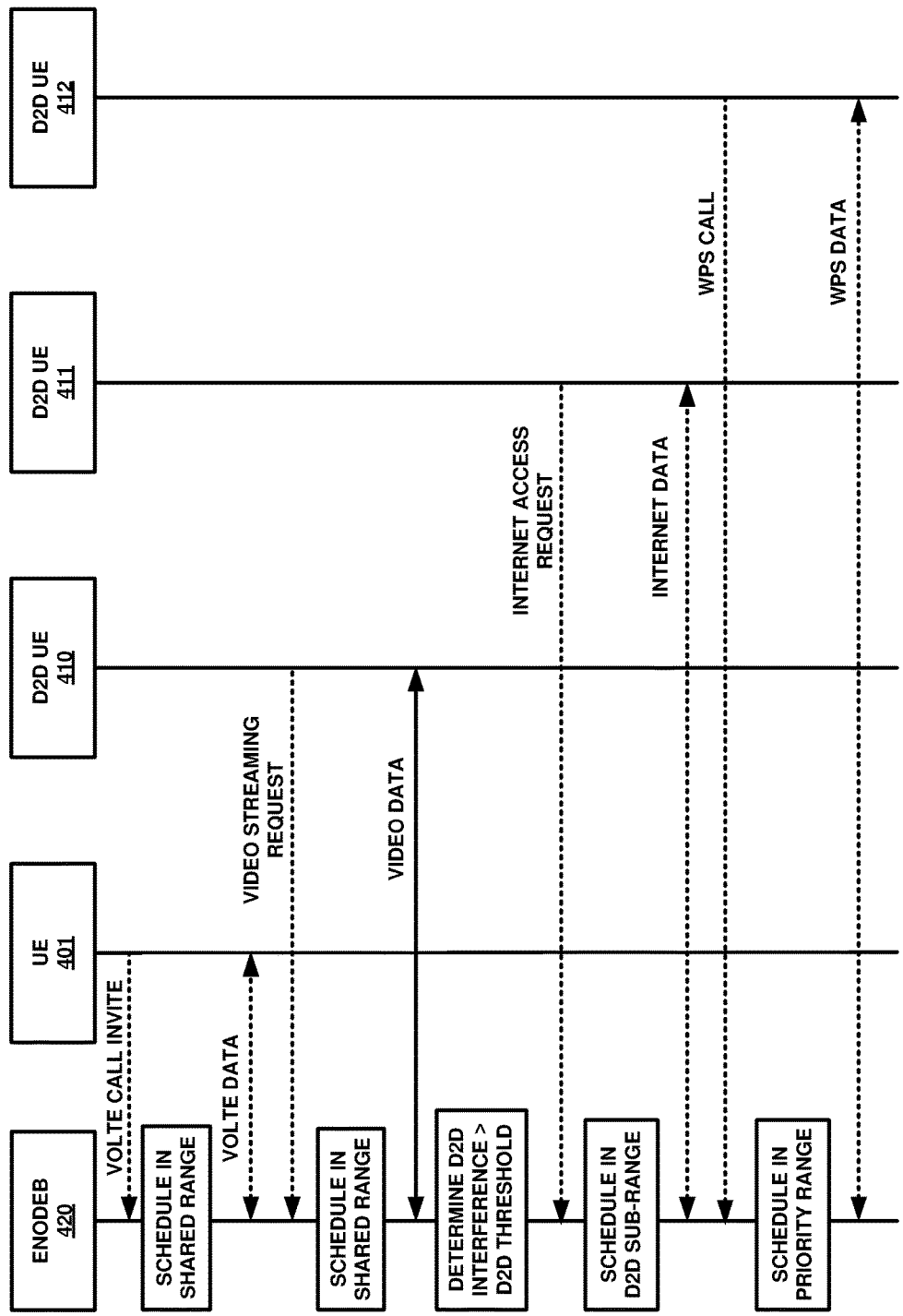

FIG. 5 illustrates an operation of LTE communication system 400 to control D2D scheduling. UE 401 wirelessly attaches to LTE eNodeB 420 and wirelessly transmits a Voice over LTE (VoLTE) call invite to LTE eNodeB 420. LTE eNodeB 420 schedules resource blocks for UE 401 in a shared resource range. LTE eNodeB 420 then wirelessly exchanges VoLTE data with UE 401 using the scheduled UE resources in a shared resource range.

In a next operation, LTE eNodeB 420 wirelessly receives a first D2D communication request for first D2D UE 410. In this example, the first D2D communication request comprises a video streaming request and responsively schedules D2D resources for the first D2D communication request in the shared resource range. LTE eNodeB 420 then exchanges video streaming data with D2D UE 410. Next, LTE eNodeB 420 detects D2D interference for individual UE 401 and determines that the D2D interference exceeds a D2D interference threshold.

LTE eNodeB 420 wirelessly receives a second D2D communication request for second D2D UE 411. In this example, the second D2D communication request may comprise an internet access request. In response to determining that the detected D2D interference for UE 401 exceeds the D2D interference threshold, LTE eNodeB 420 schedules D2D resources for the second D2D communication request in a D2D dedicated resource sub-range. LTE eNodeB 420 then receives a WPS call invite from third D2D UE 412. Since the WPS call invite is a priority call, LTE eNodeB 420 schedules the D2D resources in a priority resource sub-range. LTE eNodeB 420 may then exchange WPS call data with D2D UE 412. It should be noted that when receiving a WPS call from a UE that is not a D2D UE, such as UE 403, LTE eNodeB 420 would also schedule UE resources in the priority resource sub-range.

Figure 6A:
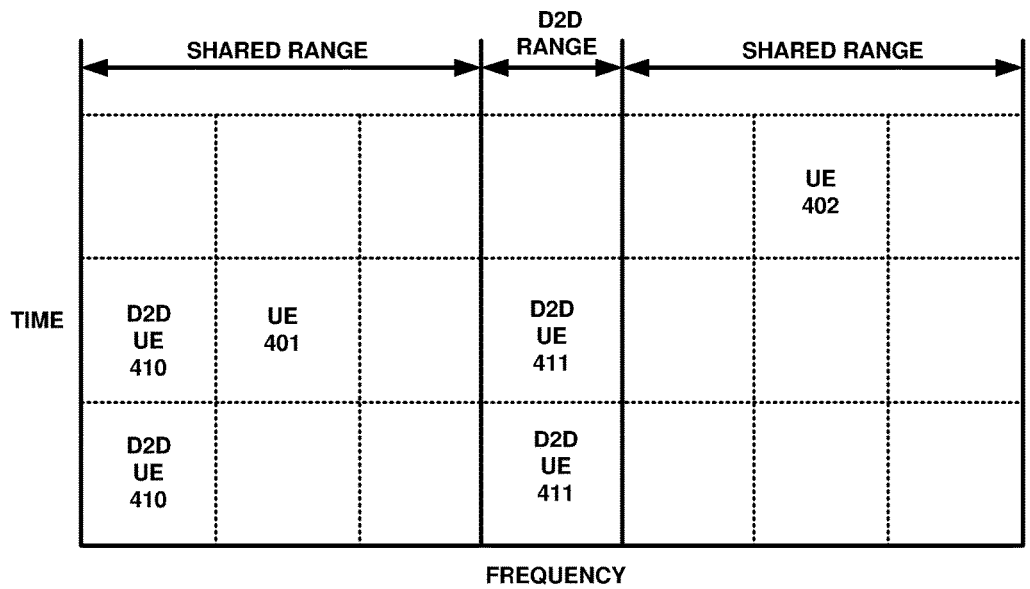
FIGS. 6A-6B illustrate allocated resource ranges to control D2D resource scheduling.
Figure 6B:
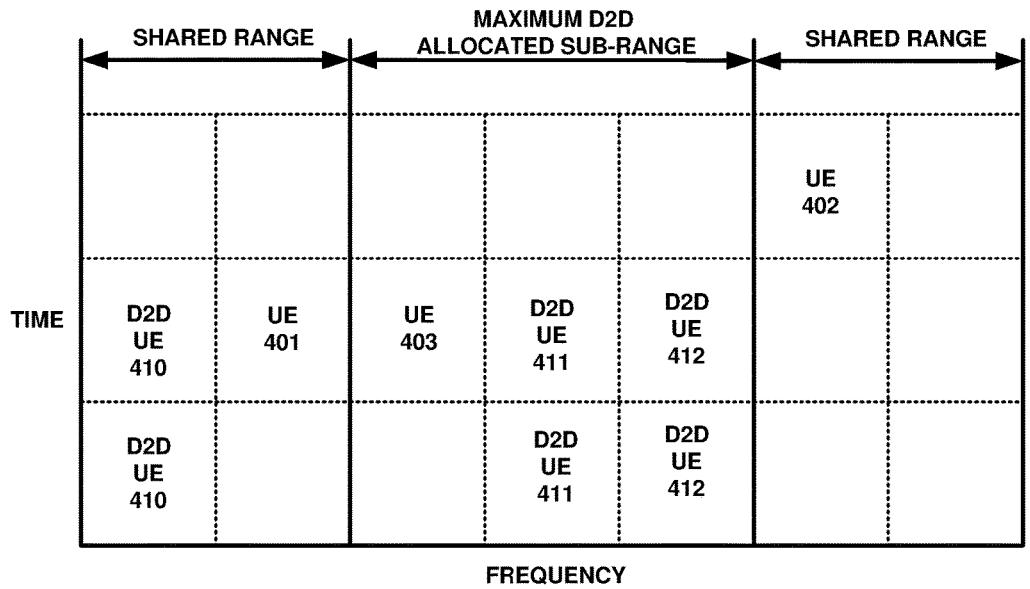

FIGS. 6A-6B illustrate allocated resource ranges to control D2D resource scheduling. FIGS. 6A-6B each include resource blocks that are allocated based on timeslots and frequencies. FIGS. 6A-6B also include a shared resource range with a D2D dedicated resource range located within the shared resource range. Referring to FIG. 6A, UE resources for UEs 401-402 and D2D UE 410 are scheduled in the shared resource ranges. However, in response to determining D2D interference for one or more of UEs 401-402 and D2D UE 410 exceeds a D2D interference threshold, D2D resources for D2D UE 411 are scheduled in the D2D dedicated resource sub-range.

Referring next to FIG. 6B, UE resources for UEs 401-402 and D2D UE 410 are again scheduled in the shared resource ranges. Also, D2D resources for D2D UEs 411-412 are scheduled in the D2D dedicated resource sub-range. It should be noted that resources for UE 403 are also scheduled in the D2D dedicated resource sub-range which may be due to UE 403 initiating a WPS priority call and the resource priority sub-range is included in the D2D dedicated resource sub-range. As seen by comparing FIG. 6A and FIG. 6B, as more D2D UEs and WPS UEs are scheduled in the D2D dedicated resource sub-range, the D2D dedicated resource sub-range increases until the D2D dedicated resource sub-range reaches a maximum D2D dedicated resource sub-range threshold. In response to the D2D dedicated resource sub-range reaching the maximum D2D dedicated resource sub-range threshold, D2D is disabled for any additional D2D UEs wirelessly transmitting D2D communication requests.

Figure 7:
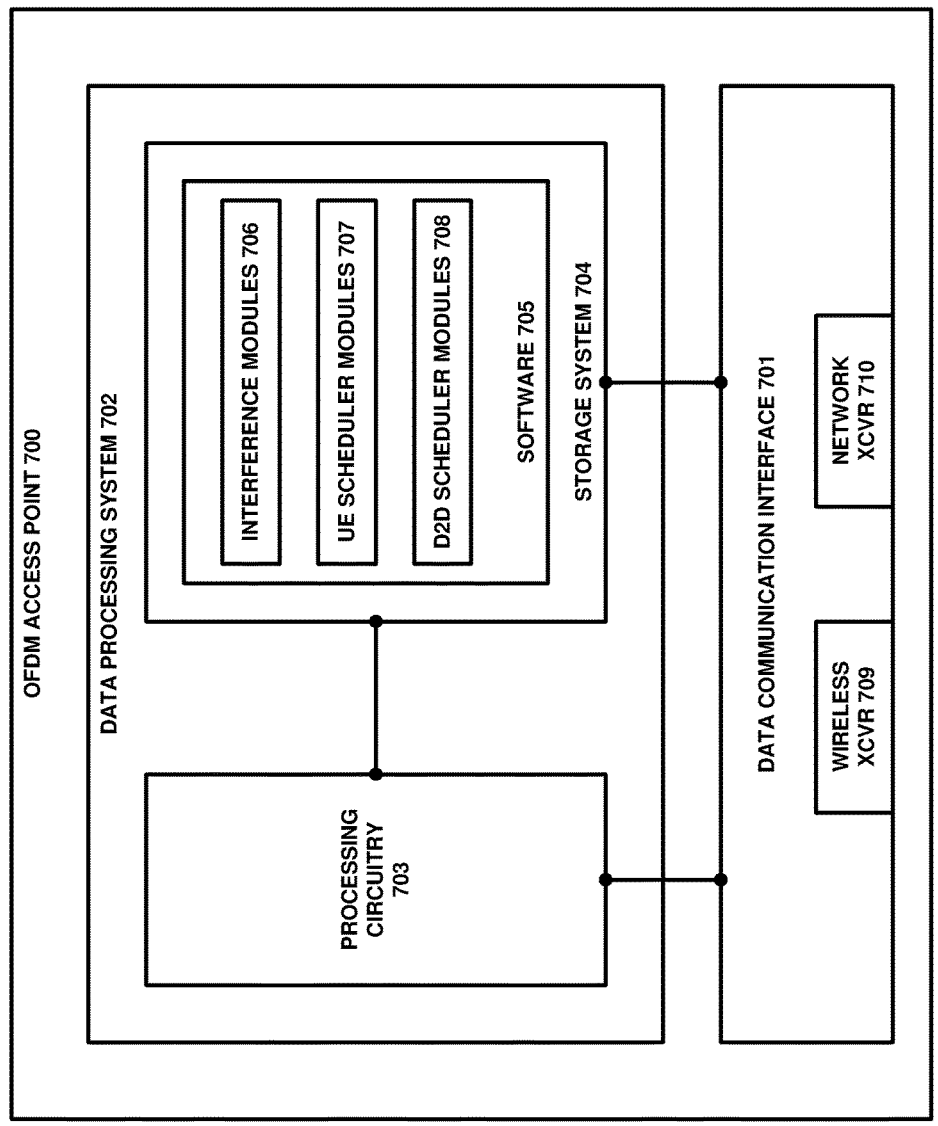
FIG. 7 illustrates an OFDM access point to control D2D scheduling.

FIG. 7 illustrates OFDM access point 700 to control D2D scheduling. OFDM access point 700 is an example of OFDM access point 120 and eNodeB 420, although OFDM access point 120 and eNodeB 420 may use alternative configurations and operations. OFDM access point 700 comprises data communication interface 701 and data processing system 702. Data communication interface 701 comprises wireless transceiver 709 and network transceiver 710. Data processing system 702 comprises processing circuitry 703 and storage system 704. Storage system 704 stores software 705. Software 705 includes respective software modules 706-709.

Wireless transceiver 709 comprises wireless communication components, such as antennas, amplifiers, filters, modulators, digital signal processors, bus interfaces, memory, software, and the like. Network transceiver 710 may comprise wireless and/or wireline communication components, such as ports, bus interfaces, digital signal processors, antennas, amplifiers, filters, modulators, memory, software, and the like. Processing circuitry 703 comprises server blades, circuit boards, bus interfaces, integrated circuitry, and associated electronics. Storage system 704 comprises non-transitory, machine-readable, data storage media, such as flash drives, disc drives, memory circuitry, data servers, and the like. Software 705 comprises machine-readable instructions that control the operation of processing circuitry 703 when executed. OFDM access point 700 may be centralized or distributed. All or portions of software modules 706-708 may be externally stored on one or more storage media, such as circuitry, discs, and the like. Some conventional aspects of OFDM access point 700 are omitted for clarity, such as power supplies, enclosures, and the like.

When executed by processing circuitry 703, interference module 706 directs circuitry 703 to detect D2D interference for one or more UEs and determine that the D2D interference exceeds a D2D interference threshold. When executed by processing circuitry 703, shared resource module 707 directs circuitry 703 to schedule UE resources and first D2D resources in a shared resource range. When executed by processing circuitry 703, D2D dedicated resource module 708 directs circuitry 703 to schedule D2D resources for a second D2D communication request in a D2D dedicated resource sub-range in response to it being determine that the D2D interference exceeds a D2D interference threshold.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating an Orthogonal Frequency Division Multiplexing (OFDM) communication network to control Device-to-Device (D2D) scheduling, the method comprising:
   an OFDM access point wirelessly exchanging wireless communications with non-D2D User Equipment (UEs) using a shared group of adjacent OFDM resource blocks in individual OFDM time slots;
   the OFDM access point wirelessly receiving a first D2D communication request for a first D2D UE and responsively scheduling the first D2D UE in the shared group of the adjacent OFDM resource blocks in the individual OFDM time slots;
   the OFDM access point detecting D2D interference for one of the non-D2D UEs and determining that the D2D interference exceeds a D2D interference threshold;
   the OFDM access point wirelessly receiving a second D2D communication request for a second D2D UE, and in response to the D2D interference exceeding the D2D interference threshold, scheduling the second D2D UE in a dedicated group of adjacent OFDM resource blocks in the individual OFDM time slots;
   the OFDM access point determining that an amount of the adjacent OFDM resource blocks in the dedicated group exceeds a maximum dedicated threshold, in response to scheduling the second D2D UE in the dedicated group of the adjacent OFDM resource blocks in the individual OFDM time slots; and
   the OFDM access point wirelessly receiving a third D2D communication request for a third D2D UE, and in response to the amount of the adjacent OFDM resource blocks in the dedicated group exceeding the maximum dedicated threshold, disabling D2D for the third D2D UE.

2. The method of claim 1 further comprising:
   in response to scheduling the second D2D UE in the dedicated group of the adjacent OFDM resource blocks in the individual OFDM time slots, the OFDM access point detecting additional D2D interference for one of the non-D2D UEs and determining that the additional D2D interference does not exceed the D2D interference threshold; and
   the OFDM access point wirelessly receiving a fourth D2D communication request for a fourth D2D UE, and in response to the additional D2D interference not exceeding the D2D interference threshold, scheduling the fourth D2D UE in the shared group of the adjacent OFDM resource blocks in the individual OFDM time slots.

3. The method of claim 1 wherein the D2D interference for the one of the non-D2D UEs comprises a Signal-to-Noise Ratio (SNR) for the one of the non-D2D UEs.

4. The method of claim 1 wherein the D2D interference for the one of the non-D2D UEs comprises a Hybrid Automatic Repeat Request (HARQ) rate for the one of the non-D2D UEs.

5. The method of claim 1 further comprising the OFDM access point wirelessly receiving a Guaranteed Bit Rate (GBR) communication request for one of the non-D2D UEs and responsively scheduling the one of the non-D2D UEs in the dedicated group of the adjacent OFDM resource blocks in the individual OFDM time slots.

6. The method of claim 1 further comprising the OFDM access point wirelessly receiving a Wireless Priority Service (WPS) communication request for one of the non-D2D UEs and responsively scheduling the one of the non-D2D UEs in the dedicated group of the adjacent OFDM resource blocks in the individual OFDM time slots.

7. The method of claim 1 wherein the OFDM access point comprises a Long Term Evolution (LTE) evolved NodeB (eNodeB).

8. An Orthogonal Frequency Division Multiplexing (OFDM) communication system to control Device-to-Device (D2D) scheduling, the OFDM communication system comprising:
   an OFDM access point configured to wirelessly exchange wireless communications with non-D2D User Equipment (UEs) using a shared group of adjacent OFDM resource blocks in individual OFDM time slots;

the OFDM access point configured to wirelessly receive a first D2D communication request for a first D2D UE and responsively schedule the first D2D UE in the shared group of the adjacent OFDM resource blocks in the individual OFDM time slots;

the OFDM access point configured to detect D2D interference for one of the non-D2D UEs and determine that the D2D interference exceeds a D2D interference threshold;

the OFDM access point configured to wirelessly receive a second D2D communication request for a second D2D UE, and in response to the D2D interference exceeding the D2D interference threshold, schedule the second D2D UE in a dedicated group of adjacent OFDM resource blocks in the individual OFDM time slots;

the OFDM access point configured to determine that an amount of the adjacent OFDM resource blocks in the dedicated group exceeds a maximum dedicated threshold, in response to the OFDM access point configured to schedule the second D2D UE in the dedicated group of the adjacent OFDM resource blocks in the individual OFDM time slots; and the OFDM access point configured to wirelessly receive a third D2D communication request for a third D2D UE, and in response to the amount of the adjacent OFDM resource blocks in the dedicated group exceeding the maximum dedicated threshold, disable D2D for the third D2D UE.

9. The OFDM communication system of claim 8 further comprising:

in response to the OFDM access point configured to schedule the second D2D UE in the dedicated group of the adjacent OFDM resource blocks in the individual OFDM time slots, the OFDM access point configured to detect additional D2D interference for one of the non-D2D UEs and determine that the additional D2D interference does not exceed the D2D interference threshold; and the OFDM access point configured to wirelessly receive a fourth D2D communication request for a third D2D UE, and in response to the additional D2D interference not exceeding the D2D interference threshold, schedule the fourth D2D UE in the shared group of the adjacent OFDM resource blocks in the individual OFDM time slots.

10. The OFDM communication system of claim 8 wherein the D2D interference for the non-D2D UEs comprises a Signal-to-Noise Ratio (SNR) for the one of the non-D2D UEs.

11. The OFDM communication system of claim 8 wherein the D2D interference for the non-D2D UEs comprises a Hybrid Automatic Repeat Request (HARQ) rate for the one of the non-D2D UEs.

12. The OFDM communication system of claim 8 further comprising, the OFDM access point configured to wirelessly receive a Guaranteed Bit Rate (GBR) communication request for one of the non-D2D UEs and responsively schedule the one of the non-D2D UEs in the dedicated group of the adjacent OFDM resource blocks in the individual OFDM time slots.

13. The OFDM communication system of claim 8 further comprising the OFDM access point configured to wirelessly receive Wireless Priority Service (WPS) communication request for one of the non-D2D UEs and responsively schedule the one of the non-D2D UEs in the dedicated group of the adjacent OFDM resource blocks in the individual OFDM time slots.

14. The OFDM communication system of claim 8 wherein the OFDM access point comprises a Long Term Evolution (LTE) evolved NodeB (eNodeB).

* * * * *